US012664815B2

(12) United States Patent
Chung et al.

(10) Patent No.: US 12,664,815 B2
(45) Date of Patent: Jun. 23, 2026

(54) FINGERPRINT SENSOR PACKAGE AND FINGERPRINT AUTHENTICATION CARD INCLUDING THE SAME

(71) Applicant: Samsung Electronics Co., Ltd., Suwon-si (KR)

(72) Inventors: Yechung Chung, Suwon-si (KR); Yoon-Seok Seo, Suwon-si (KR); Jaehyun Lim, Suwon-si (KR); Inho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/790,331

(22) Filed: Jul. 31, 2024

(65) Prior Publication Data

US 2025/0166408 A1 May 22, 2025

(30) Foreign Application Priority Data

Nov. 21, 2023 (KR) ........................ 10-2023-0162323

(51) Int. Cl.
*G06V 40/13* (2022.01)
*G06Q 20/34* (2012.01)
(52) U.S. Cl.
CPC ....... *G06V 40/1306* (2022.01); *G06Q 20/341* (2013.01)
(58) Field of Classification Search
None
See application file for complete search history.

(56) References Cited

U.S. PATENT DOCUMENTS

| | | | |
|---|---|---|---|
| 10,185,866 B2 | 1/2019 | Goodelle et al. | |
| 10,891,459 B2 | 1/2021 | Lundahl | |
| 11,397,883 B2 | 7/2022 | Lee | |
| 11,538,268 B2 | 12/2022 | Lim et al. | |
| 11,900,709 B2 | 2/2024 | Lim et al. | |
| 2012/0049309 A1 | 3/2012 | Kiyomoto et al. | |
| 2017/0083745 A1 | 3/2017 | Goodelle et al. | |
| 2020/0097694 A1 | 3/2020 | Lundahl | |
| 2022/0293507 A1* | 9/2022 | Lim .................. H01L 23/3121 |
| 2022/0375249 A1* | 11/2022 | Liu .................. G06V 40/1306 |
| 2023/0177300 A1 | 6/2023 | Lee et al. | |

FOREIGN PATENT DOCUMENTS

| | | |
|---|---|---|
| CN | 110321831 A | 10/2019 |
| CN | 112889067 B | 11/2022 |
| KR | 101168056 B1 | 7/2012 |

(Continued)

*Primary Examiner* — Joseph R Haley
(74) *Attorney, Agent, or Firm* — Wolf, Greenfield & Sacks, P.C.

(57) ABSTRACT

A fingerprint sensor package includes: a substrate including an insulating layer and a wiring layer; a fingerprint sensor chip on the substrate; a molding material to mold the fingerprint sensor chip on the substrate and including a first region and a second region surrounding the first region; and a buffer member on the second region of the molding material; the wiring layer includes a wiring pattern extending from an inside to an outside of the molding material; a vertical level of an upper surface of the second region of the molding material is lower than a vertical level of an upper surface of the first region of the molding material.

20 Claims, 15 Drawing Sheets

(56)     References Cited

FOREIGN PATENT DOCUMENTS

| | | | |
|---|---|---|---|
| KR | 20180016284 | A | 2/2018 |
| KR | 102195672 | B1 | 12/2020 |
| KR | 20220013230 | A | 2/2022 |
| KR | 20220056666 | A | 5/2022 |
| KR | 20220074128 | A | 6/2022 |
| KR | 20220126538 | A | 9/2022 |
| KR | 102509276 | B1 | 3/2023 |

* cited by examiner

FINGERPRINT SENSOR PACKAGE AND FINGERPRINT AUTHENTICATION CARD INCLUDING THE SAME

CROSS-REFERENCE TO RELATED APPLICATION

This application claims priority to and the benefit of Korean Patent Application No. 10-2023-0162323, filed in the Korean Intellectual Property Office on Nov. 21, 2023, the entire contents of which are incorporated herein by reference.

BACKGROUND

The present disclosure relates to a fingerprint sensor package and a fingerprint authentication card including the same.

In the case of a general credit card that is commercially available in public, there is a risk of theft or forgery when lost, and to prevent this, the user is asked to enter a password in the card reader when using the card. However, as many people share the card reader, there is a risk of exposing passwords as well as cleanliness issues.

In order to solve these problems, there is a growing demand for a fingerprint authentication card that processes payment by identifying the identity through the user's fingerprint. The fingerprint sensor package mounted on the fingerprint authentication card may be easily damaged due to the thin thickness of the card and the card being frequently used by the user. In particular, if a crack occurs in the wiring of the fingerprint sensor package, the use of the fingerprint authentication card becomes impossible, and inconvenience may occur due to card replacement.

Therefore, it is desirable to provide a new fingerprint sensor package that helps prevent wire crack of the fingerprint sensor package.

SUMMARY

The present disclosure provides a fingerprint sensor package capable of preventing cracks in a wiring pattern without increasing thickness and a fingerprint authentication card including the same.

According to some embodiments, the present disclosure provides a fingerprint sensor package which includes a substrate including an insulating layer and a wiring layer; a fingerprint sensor chip on the substrate; a molding material on the substrate to mold the fingerprint sensor chip and including a first region and a second region surrounding the first region; and a buffer member on the second region of the molding material, wherein the wiring layer includes a wiring pattern extending from an inside to an outside of the molding material, and a vertical level of an upper surface of the second region of the molding material is lower than a vertical level of an upper surface of the first region of the molding material.

According to some embodiments, the present disclosure provides a fingerprint sensor package which includes a substrate including an insulating layer and a wiring layer; a fingerprint sensor chip on the substrate; a first molding material on the substrate at least partially covering the fingerprint sensor chip and including a first region and a second region surrounding the first region; and a second molding material on a side surface of the first region of the first molding material and an upper surface of the second region of the first molding material, wherein the wiring layer includes a wiring pattern extending outwardly from an inside to an outside of the first molding material; a vertical level of an upper surface of the second region of the first molding material is lower than a vertical level of an upper surface of the first region of the first molding material, and an elastic modulus of the second molding material is less than an elastic modulus of the first molding material.

According to some embodiments, the present disclosure provides a fingerprint authentication card which includes a card body having a groove; and a fingerprint sensor package in the groove, wherein the fingerprint sensor package includes a substrate including an insulating layer and a wiring layer; a fingerprint sensor chip on the substrate; a molding material on the substrate and on the fingerprint sensor chip and including a first region and a second region surrounding the first region; and a buffer member between the second region of the molding material and the card body, and wherein the wiring layer includes a wiring pattern extending outwardly from an inside to an outside of the molding material, and a vertical level of an upper surface of the second region of the molding material is lower than a vertical level of an upper surface of the first region of the molding material, and the fingerprint sensor package is in the groove so that the molding material faces the card body.

According to present disclosure, it is possible to provide a fingerprint sensor package capable of preventing the crack of the wiring pattern without an increase in thickness and a fingerprint authentication card including the same.

BRIEF DESCRIPTION OF THE DRAWINGS

FIG. 14 is a cross-sectional view of a fingerprint authentication card according to some other embodiments of the present disclosure.

FIG. 15 is a cross-sectional view of a fingerprint authentication card according to some other embodiments of the present disclosure.

DETAILED DESCRIPTION

Figure 1:
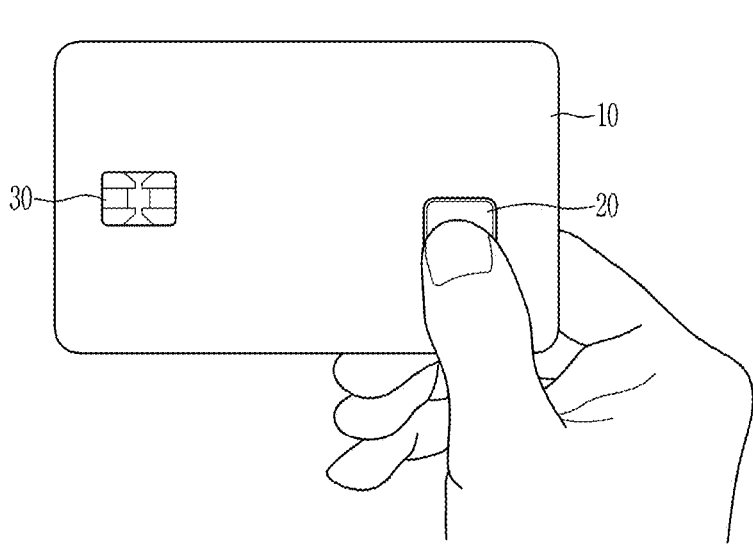
FIG. 1 is a schematic top view of a fingerprint authentication card.

Hereinafter, with reference to the accompanying drawings, example embodiments of the present disclosure will be described in detail so that a person of an ordinary skill in the art could easily carry out the present disclosure. The present disclosure may be implemented in several different forms but is not limited to the embodiments described herein.

To clearly explain the present disclosure, parts that do not have a relationship with the explanation may be omitted, and throughout the specification, identical or similar component is assigned the same reference numerals.

In addition, the size and thickness of each component shown in the drawing may be arbitrarily shown for better understanding and ease of description, so the present disclosure is not necessarily limited to what is shown. In the drawings, the thickness may be enlarged in order to clearly express several layers and regions. And in the drawings, for better understanding and ease of description, the thickness of some layers and regions may be exaggerated.

Throughout this specification, when a part is "connected" to another element, it may include not only being "directly connected" but also being "indirectly connected" with other members in between. From a similar perspective, it may include not only being "physically connected" but also being "electrically connected".

In addition, when a part of a layer, film, region, substrate, etc. is "above" or "on" other part, this may include not only the case where the other part is "directly above or above" but also the case where there is another part in the middle. In contrast, when an element is referred to as being "directly on" another element, it means that there are no intervening elements present. In addition, being "above" or "on" a reference part may mean being positioned above or below the reference part, and does not necessarily mean being positioned "above" or "on" it in the opposite direction of gravity.

In addition, when a part "includes" or "comprises" a component throughout the specification, this means that it may include more other components, rather than excluding other components, unless otherwise stated.

In addition, throughout the specification, the phrase "in plane" means when a target portion is viewed from above or below, and the phrase "on a cross-section" means when a cross-section taken by vertically cutting a target portion is viewed from the side.

In addition, throughout the specification, the order of first, second, etc. is used to distinguish a component from another component that is the same or similar, and is not necessarily used to refer to a specific component. Therefore, a configuration referred to as the first component in a specific part of this specification may be referred to as the second component in another part of this specification.

In addition, throughout the specification, a singular reference to a component may include a plural reference to a plurality of components unless otherwise stated. For example, "insulating layer" may be used not only to mean one insulating layer, but also to mean the plurality of insulating layers, such as two, three, or more.

In addition, throughout the specification, mentions of one side and the other side are intended to distinguish between different sides, and are not necessarily intended to be limited to a specific side. Therefore, the surface referred to as one surface in a specific part of the present specification may be referred to as the other surface in other parts of the present specification.

FIG. 1 is a schematic top view of a fingerprint authentication card.

The fingerprint authentication card 1 may include a card body 10, a fingerprint sensor package 20, and a security chip 30.

The card body 10 of the fingerprint authentication card 1 may be formed of, for example, plastic.

The fingerprint sensor package 20 may recognize the fingerprint when the user's fingerprint is in contact therewith, compare the recognized fingerprint with the registered fingerprint, and determine whether there is a match between them.

The security chip 30 may store encrypted financial information. When the recognized fingerprint, through the fingerprint sensor package 20, matches the registered fingerprint, the security chip 30 may grant a payment authority to the user.

Through the above-described fingerprint authentication procedure, the fingerprint authentication card 1 may confirm the identity of the user, grant payment authority to the identified user, and therefore, it is possible to solve problems such as theft and forgery.

Hereinafter, with reference to the drawings, a fingerprint sensor package according to example embodiments of the present disclosure will be described.

Figure 2:
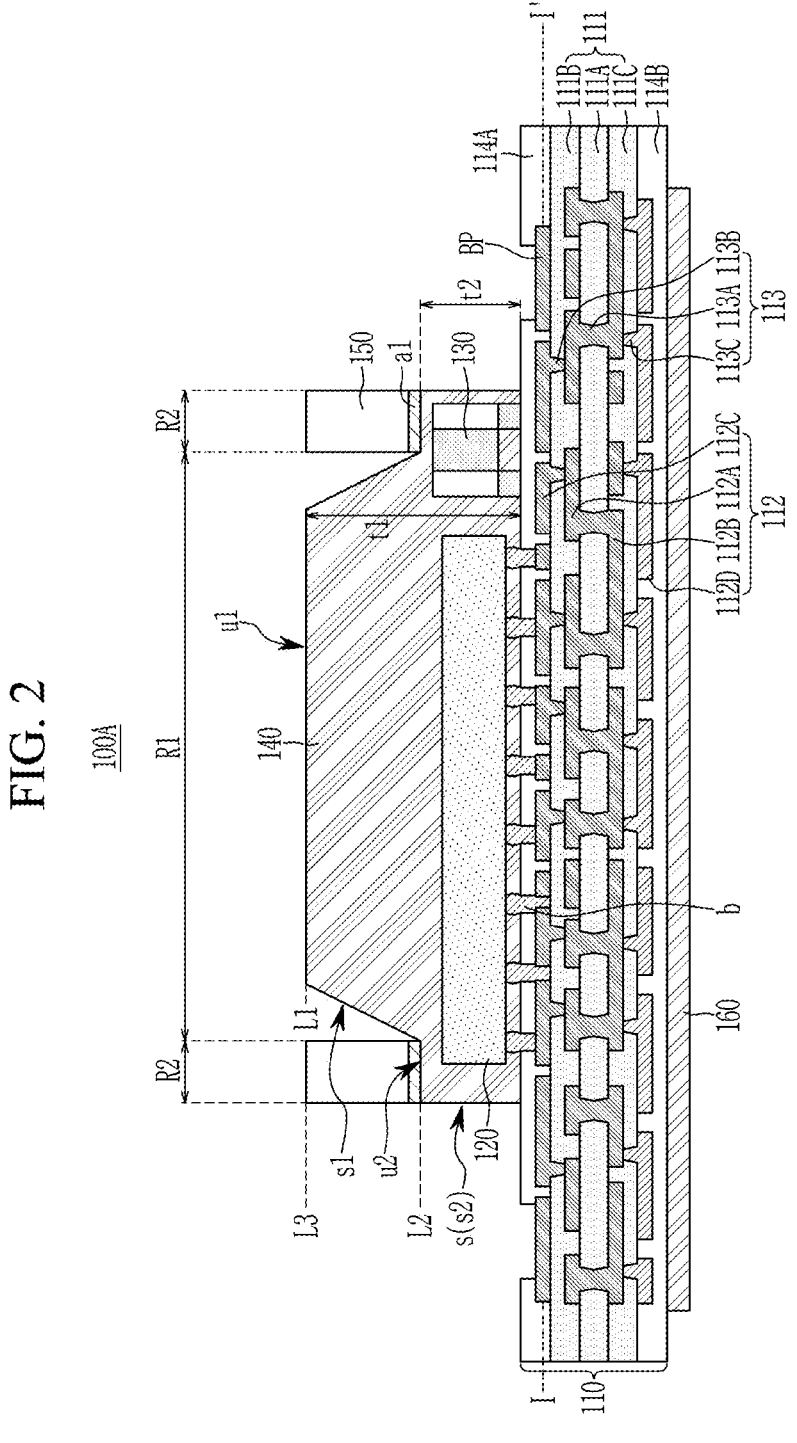
FIG. 2 is a cross-sectional view of a fingerprint sensor package according to some embodiments of the present disclosure.

FIG. 2 is a cross-sectional view of a fingerprint sensor package according to some embodiments of the present disclosure.

Figure 3:
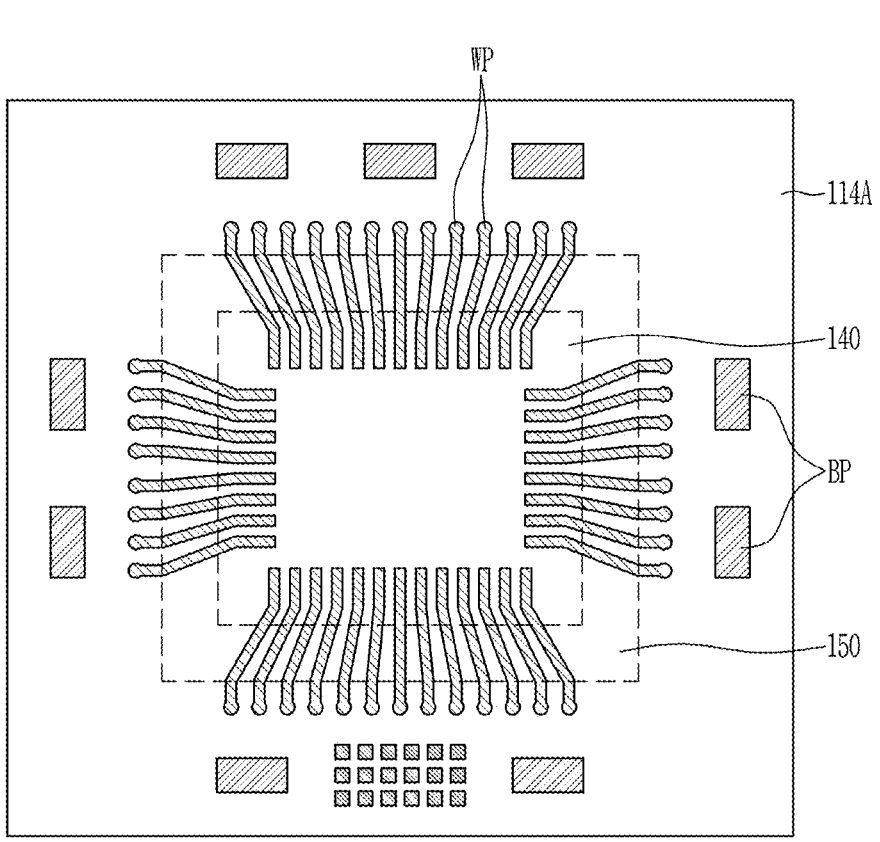
FIG. 3 is a cut plan view of the fingerprint sensor package taken along a I-I' direction of FIG. 2.

FIG. 3 is a cut plan view of the fingerprint sensor package taken along a I-I' direction of FIG. 2.

Figure 4:
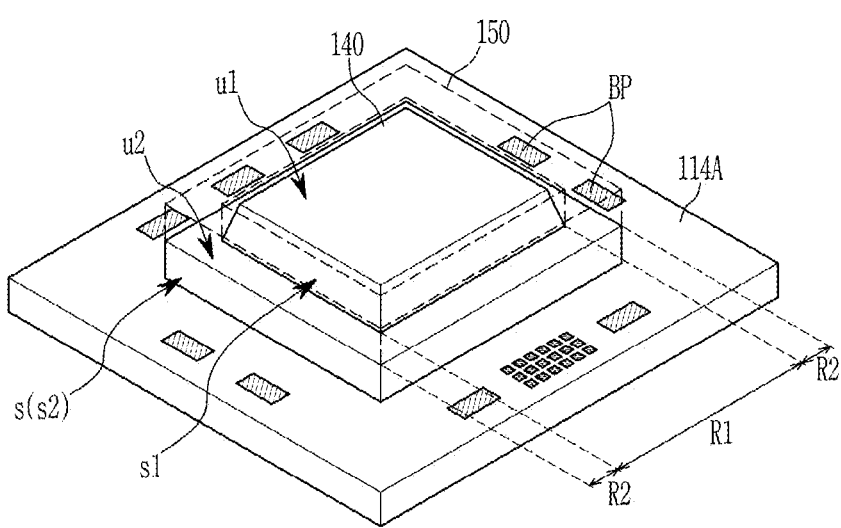
FIG. 4 is a perspective view of the fingerprint sensor package of FIG. 2.

FIG. 4 is a perspective view of the fingerprint sensor package of FIG. 2.

Referring to the drawings, the fingerprint sensor package 100A may include a substrate 110, a fingerprint sensor chip 120, a passive device 130, a molding material 140, a buffer member 150, and a coating layer 160.

The substrate 110 may include an insulating layer 111, a wiring layer 112, a via 113, and protection layers 114A and 114B.

The insulating layer 111 may be a plurality of insulating layers 111. For example, the substrate 110 may include a first insulating layer 111A, a second insulating layer 111B placed on one surface of the first insulating layer 111A, and a third insulating layer 111C placed on the other (opposite) surface of the first insulating layer 111A.

The first insulating layer 111A may be a core insulating layer positioned in the middle of the plurality of insulating layers 111. The first insulating layer 111A, which may be a core insulating layer, may be formed of a material having thickness and rigidity greater than other insulating layers, but is not limited thereto.

As a material of the insulating layer 111, the material having insulating properties may be used, and for example, a thermosetting resin such as polyimide, a thermosetting resin such as epoxy, and a prepreg, an Ajinomoto Build-up Film (ABF), etc. may be used.

The wiring layer 112 may be placed on the insulating layer 111 and may be covered or surrounded with the insulating layer 111 placed on another layer.

The wiring layer 112 may be a plurality of wiring layers 112 placed on each of the plurality of insulating layers 111. For example, the substrate 110 may include a first wiring layer 112A placed on one surface of the first insulating layer 111A and covered with or surrounded by the second insulating layer 111B, a second wiring layer 112B placed on the other (opposite) surface of the first insulating layer 111A and covered with or surrounded by the third insulating layer 111C, a third wiring layer 112C placed on the second insulating layer 111B, and a fourth wiring layer 112D placed on the third insulating layer 111C.

Meanwhile, the fingerprint sensor package 100A may have a structure of a fan-out wafer level package (FO-WLP) or a fan-out panel level package (FO-PLP). In this case, the I/O pad of the chip having a fine pitch may be expanded through the substrate 110, and the substrate 110 may include wiring patterns WP extending to the outside of the fingerprint sensor chip 120.

In addition, the substrate 110 may include a connection pad BP that is exposed to the outside of the fingerprint sensor package 100A to electrically connect the fingerprint sensor package 100A to the card body. To this end, the molding material 140 may be placed only on the central region of the substrate 110 where the fingerprint sensor chip 120 and the passive device 130 are placed, but the molding material 140 may not exist on or extend to the edge region including the region where the connection pad BP of the substrate 110 is placed.

In this way, the wiring layer 112 may include wiring patterns WP oriented toward the outside of the substrate 110, while the molding material 140 is placed only on the central region of the substrate 110, so the wiring layer 112 may include a wiring pattern WP extending from the inside to the outside of the molding material 140 in plane.

The wiring pattern WP extending from the inside to the outside of the molding material 140 in plane may be included in the third wiring layer 112C closest to the fingerprint sensor chip 120 among the plurality of wiring layer 112. However, the present disclosure is not limited thereto, and the wiring pattern WP extending from the inside to the outside of the molding material 140 in plane may be included in at least one of the first wiring layer to fourth wiring layers 112A, 112B, 112C, and 112D.

As described above, the connection pad BP may be exposed to the outside of the fingerprint sensor package 100A for connection with the card body, and thus it may be positioned outside of the molding material 140 in plane. For bonding the fingerprint sensor package 100A and the card body, the connection pad BP may be included in the third wiring layer 112C positioned on the uppermost side of the plurality of wiring layers 112.

Meanwhile, although not specifically shown in the drawings, at least one of the first to fourth wiring layers 112A, 112B, 112C, and 112D may include sensing patterns capable of sensing a user's fingerprint. For example, each of the fourth wiring layer 112D and the second wiring layer 112B which are adjacent to the coating layer 160 may include sensing patterns. The sensing patterns included in the fourth wiring layer 112D and the sensing patterns included in the second wiring layer 112B may intersect in plane, and the region in which they overlap in plane may constitute a pixel capable of sensing. In addition, the wiring layer 112 may further include a ground pattern, a signal pattern, a power pattern, and the like.

As a material of the wiring layer 112, a conductive material may be used, and for example, aluminum (Al), copper (Cu), gold (Au), silver (Ag), platinum (Pt), tin (Sn), chromium (Cr), palladium (Pd), lead (Pb), titanium (Ti), or alloy thereof may be used.

The via 113 may penetrate or extend through the insulating layer 111 to electrically connect the wiring layer 112 placed on different layers.

The via 113 may be a plurality of vias 113 placed on different layers. For example, the substrate 110 may include a first via 113A penetrating the first insulating layer 111A to connect the first wiring layer 112A to the second wiring layer 112B to each other, a second via 113B penetrating the second insulating layer 111B to connect the first wiring layer 112A to the third wiring layer 112C to each other, and a third via 113C penetrating the third insulating layer 111C to connect the second wiring layer 112B to the fourth wiring layer 112D to each other.

The via 113 may have a tapered shape, an hourglass shape, a circular cylinder shape, and the like, which are narrowed in width in a direction from one side to the other side. For example, the first via 113A passing through the first insulating layer 111A, which may be a core insulating layer having thick thickness, may have an hourglass shape, and the remaining second via 113B and third via 113C may have a tapered shape whose width narrows in a direction toward the first insulating layer 111A.

As a material of the via 113, a conductive material may be used, and for example, aluminum (Al), copper (Cu), gold (Au), silver (Ag), platinum (Pt), tin (Sn), chromium (Cr), palladium (Pd), lead (Pb), titanium (Ti), or an alloy thereof may be used.

The first protection layer 114A may be placed on the second insulating layer 111B placed on the uppermost side to cover the third wiring layer 112C, and may have an opening for exposing the connection pad BP. If necessary, the fingerprint sensor package 100A may further include a second protection layer 114B placed on the third insulating layer 111C. The first protection layer 114A and the second protection layer 114B may be solder resist layers, but are not limited thereto.

The fingerprint sensor chip 120 may be placed on the substrate 110 to be electrically connected to the wiring layer 112 of the substrate 110.

When the user's fingerprint contact is in contact with the coating layer 160, the fingerprint sensor chip 120 may be a controller chip that recognizes the user's fingerprint through a change in a capacitance value between sensing patterns included in the wiring layer 112.

The fingerprint sensor chip 120 may be mounted on one surface of the substrate 110 in a flip chip manner, and a conductive bump b may be placed between the fingerprint sensor chip 120 and the substrate 110 to physically and electrically connect them. In this case, the first protection layer 114A may further have an opening to expose the bump pad contacting with the conductive bump b of the third wiring layer 112C.

A passive device 130 may be placed on the substrate 110 to be spaced apart from the fingerprint sensor chip 120, and may be molded into a molding material 140 together with the fingerprint sensor chip 120.

The passive device 130 may also be mounted on one surface of the substrate 110 in a surface mounted method and may be physically and electrically connected to the substrate 110 through, for example, a solder paste. The passive device 130 may be a multi-layer ceramic capacitor (MLCC), but is not limited thereto.

The molding material 140 may be placed on the substrate 110 to mold the fingerprint sensor chip 120 and the passive device 130 and may include a first region R1 and a second region R2 surrounding the first region R1.

The molding material 140 may be formed of, for example, a thermosetting resin such as an epoxy molding compound and an epoxy resin. In addition, the molding material 140 may be formed through known methods such as compression molding and transfer molding.

From the substrate 110, a level L2 at which the upper surface u2 of the second region R2 of the molding material 140 is positioned may be lower than a level L1 at which the upper surface u1 of the first region R1 of the molding material 140 is positioned. In other words, the second region R2 and the first region R1 of the molding material 140 may have a level difference.

The thickness t2 of the second region R2 of the molding material 140 may be 70% or more and 80% or less of the thickness t1 of the first region R1 of the molding material 140. Here, the thickness refers to a distance value between an upper surface and a lower surface of each component. When the thickness of the second region R2 and/or the first region R1 of the molding material 140 is not constant, the thickness t2 of the second region R2 of the molding material 140 and/or the thickness t1 of the first region R1 may mean average thickness of the second region R2 and/or average thickness of the first region R1. If the thickness t2 of the second region R2 of the molding material 140 is too thin, the fingerprint sensor chip 120 and the passive device 130 may not be sufficiently molded, and if it is too thick, it may be difficult for the buffer member 150 to have a thickness capable of serving as a sufficient buffer, so it may be desirable to control the thickness t2 of the second region R2 of the molding material 140 within the above-described range.

The upper surface u1 of the first region R1 of the molding material 140 may be substantially flat or planar, but is not limited thereto. In this specification, being substantially 'flat' means that the thickness formed by the lower surface and the upper surface of a certain configuration is substantially constant, and the level at which the upper surface is positioned with the lower surface as a reference is even. In addition, being 'substantially' flat means not only being completely flat, but also slightly inclined to the extent that it may be recognized as flat in consideration of error range in the process and measurement. For example, a substantially flat upper surface may include a surface in which the difference between the maximum thickness and the minimum thickness formed by the lower surface and the upper surface is 5%, 4%, 3%, 2%, or less than 1%.

In some embodiments, a side surface s1 of the first region R1 of the molding material 140 may be inclined. Therefore, the second region R2 of the molding material 140 may have a level difference from the first region R1 through the side surface s1 of the inclined first region R1. The angle formed by the side surface s1 of the first region R1 of the molding material 140 with the substrate 110 is not particularly limited, and may be changed according to design.

The side surface s2 of the second region R2 of the molding material 140 may form an approximately vertical angle with the substrate 110, but is not limited thereto, and may be inclined, for example, like the side surface of the first region R1 of the molding material 140. Meanwhile, a side surface s2 of the second region R2 of the molding material 140 may form an exterior side or exterior side surface s of the molding material 140.

A buffer member 150 may be placed on the second region R2 of the molding material 140, and specifically, the buffer member 150 may be placed on the upper surface u2 of the second region R2 of the molding material 140. The buffer member 150 may be continuously placed along the upper surface u2 of the second region R2 of the molding material 140, but also a plurality of buffer members 150 may be placed on the upper surface u2 of the second region R2 of the molding material 140 to be spaced apart from each other by a predetermined distance depending on the design.

The upper surface u2 of the second region R2 of the molding material 140 may be substantially flat or planar. Through this structure, the buffer member 150 may be stably placed on the molding material 140, and the pressure applied to the molding material 140 may be evenly distributed through the buffer member 150. In a similar viewpoint, it may be preferable that the thickness of the buffer member 150 is constant.

A level L3 at which an upper surface of the buffer member 150 is positioned may be the same as or lower than a level L1 at which an upper surface u1 of the first region R1 of the molding material 140 is positioned. When the level L3 at which the upper surface of the buffer member 150 is positioned is higher than the level L1 at which the upper surface u1 of the first region R1 of the molding material 140 is positioned, the entire thickness of the fingerprint sensor package 100A may increase, and it may be difficult to insert the entire package into the thin card body having thin thickness. In addition, since the buffer member 150 makes contact with the card body, it is difficult to stably mount the fingerprint sensor package 100A on the card body, and the pressure may be applied to the buffer member 150.

The buffer member 150 may be spaced apart from the side surface s1 of the first region R1, or may be in contact therewith.

As the material of the buffer member 150, those capable of alleviating a force applied to the molding material 140 such as a sponge, rubber, latex, and plastic foam may be used without limitation.

The fingerprint sensor package 100A may further include an adhesive member a1 placed between the molding material 140 and the buffer member 150 in order to attach the molding material 140 and the buffer member 150 to each other. As the adhesive member a1, a known adhesive tape, an anisotropic conductive film (ACF), etc. may be used.

A fingerprint of the user may be in contact with the coating layer 160, and the coating layer 160 may be placed on a surface opposite to the surface of the substrate 110 on which the fingerprint sensor chip 120 is placed. As a material of the coating layer 160, plastic, glass, or the like may be used.

Meanwhile, the fingerprint sensor package mounted on the fingerprint authentication card may be easily damaged due to the thin thickness of the card and the characteristic frequent use by the user. In particular, if a crack occurs in the wiring of the fingerprint sensor package, the use of the fingerprint authentication card becomes impossible, and inconvenience may occur due to card replacement.

In the case of the fingerprint sensor package 100A according to the present disclosure, the level L2 at which the upper surface u2 of the second region R2 of the molding material 140 is positioned is formed to be lower than the level at which the upper surface u1 of the first region R1 is positioned, and the buffer member 150 is placed on the second region R2 of the molding material 140. Therefore, the pressure applied through the molding material 140 to the wiring pattern WP extending from the inside to the outside of the molding material 140 in plane may be absorbed through the buffer member 150, thereby preventing cracks from occurring in the wiring pattern WP.

Inventors of present disclosure have confirmed that in the case of fingerprint sensor package 100A according to present disclosure, cracks do not occur in the wiring pattern (WP) in all items of the bending, torsion, 3-wheel, wrapping, and mailing of the card level reliability (CLR) test.

Figure 5:
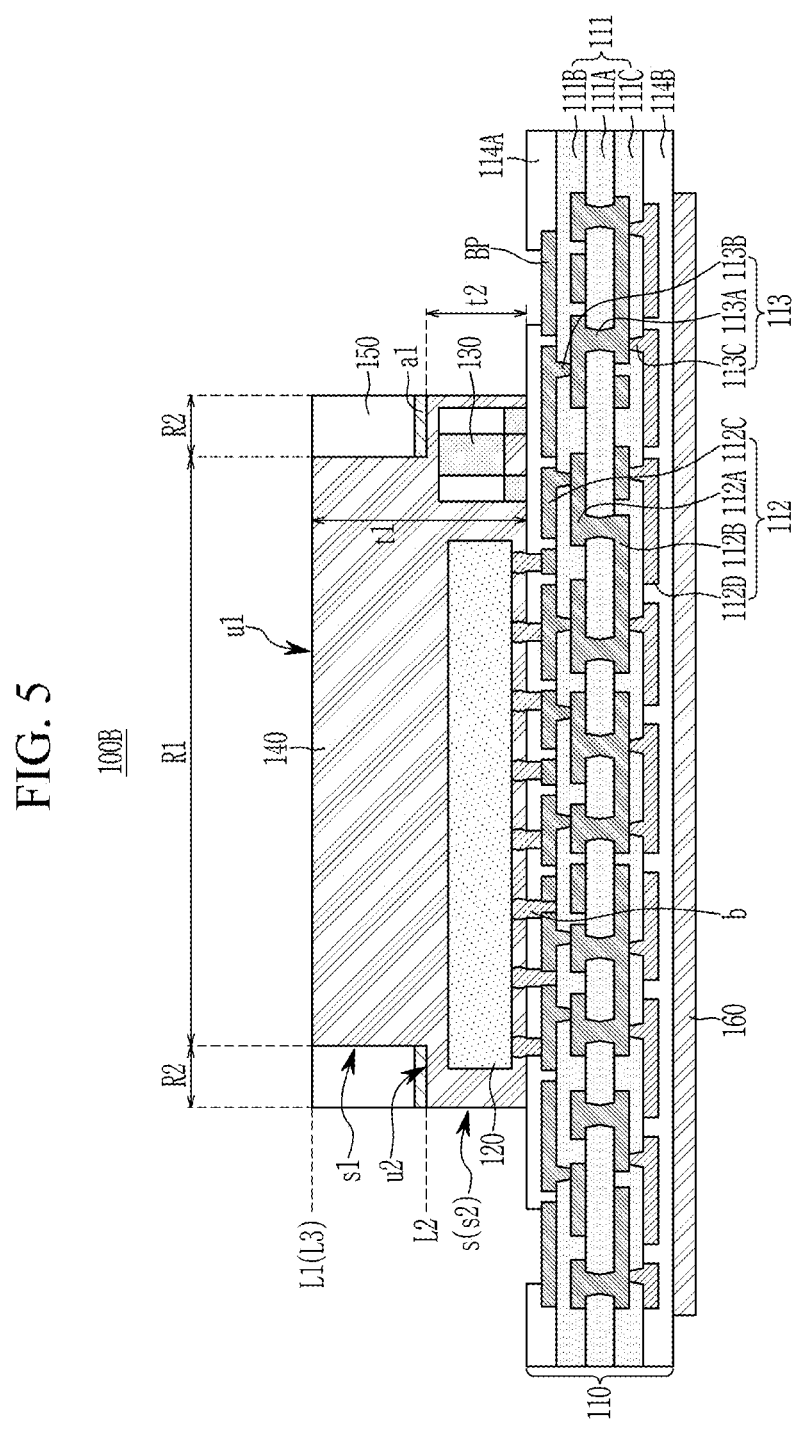
FIG. 5 is a cross-sectional view of a fingerprint sensor package according to some other embodiments of the present disclosure.

FIG. 5 is a cross-sectional view of a fingerprint sensor package according to some other embodiments of the present disclosure.

Figure 6:
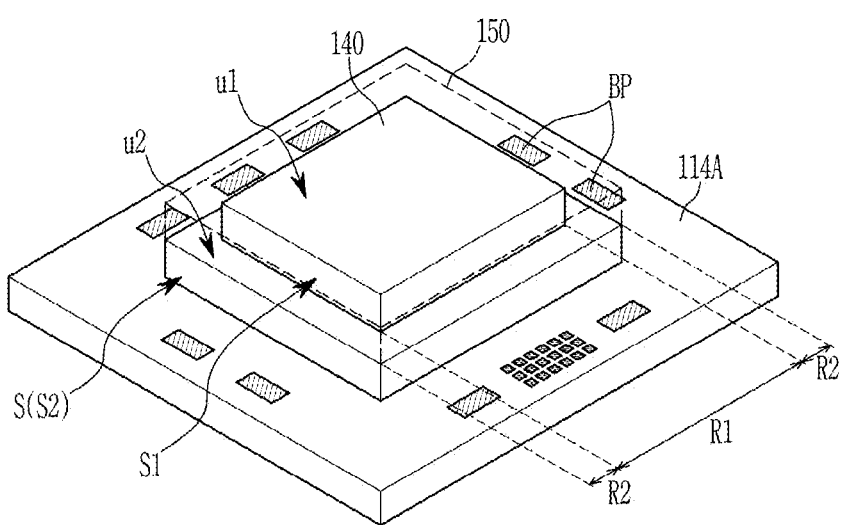
FIG. 6 is a perspective view of the fingerprint sensor package of FIG. 5.

FIG. 6 is a perspective view of the fingerprint sensor package of FIG. 5.

In the case of the fingerprint sensor package 100B according to some other embodiments of the present disclosure, a side surface s1 of the first region R1 of the molding material 140 may form an approximately vertical angle with the substrate 110. Through this structure, the area of the second region R2 in which the buffer member 150 is placed may be enlarged. An angle formed by the side surface s1 of the first region R1 of the molding material 140 and the substrate 110 may be 60° or more, 65° or more, 70° or more, 75° or more, 80° or more, 85° or more, 87° or more, 89° or more, or 90°.

In addition, since descriptions of other configurations are the same as those specifically described in other parts of the present specification, detailed descriptions of these configurations will be omitted in the interest of brevity.

Figure 7:
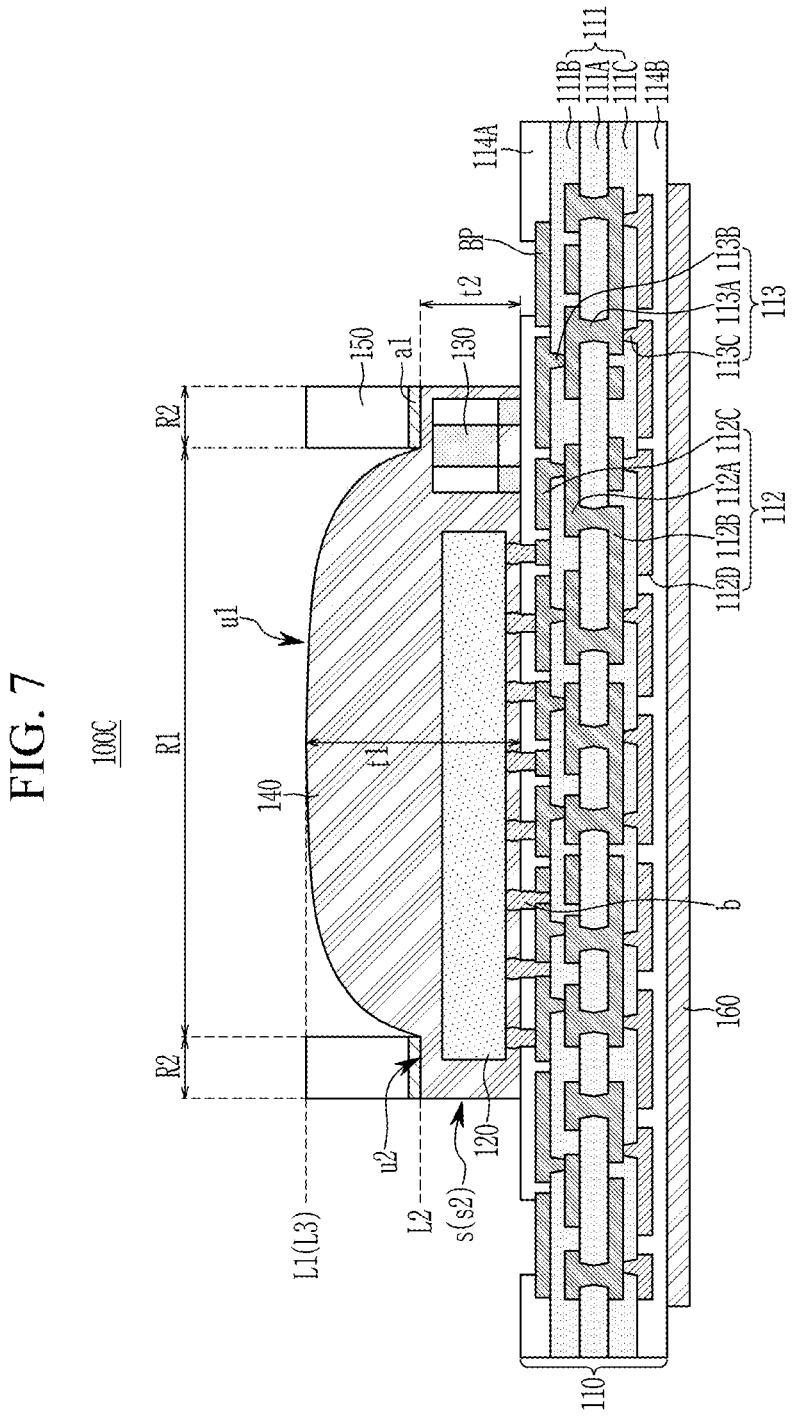
FIG. 7 is a cross-sectional view of a fingerprint sensor package according to some other embodiments of the present disclosure.

FIG. 7 is a cross-sectional view of a fingerprint sensor package according to some other embodiments of the present disclosure.

Figure 8:
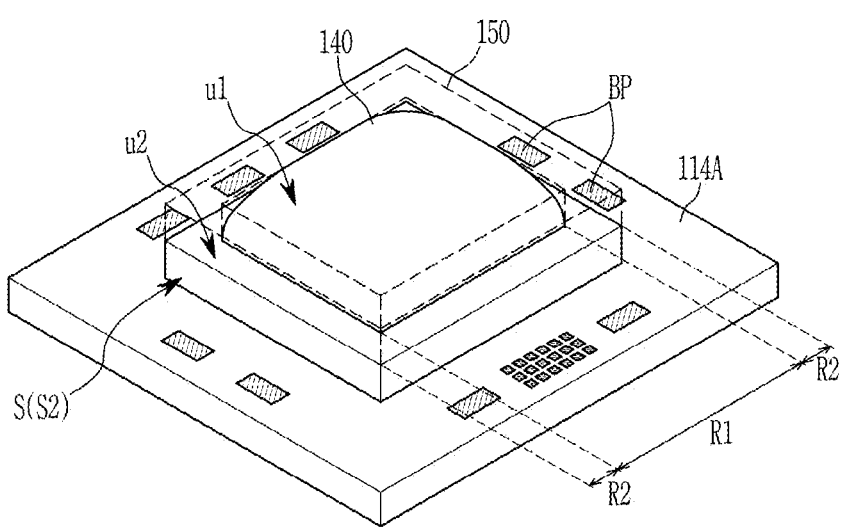
FIG. 8 is a perspective view of the fingerprint sensor package of FIG. 7.

FIG. 8 is a perspective view of the fingerprint sensor package of FIG. 7.

In the case of the fingerprint sensor package 100C according to some other embodiments of the present disclosure, the upper surface u1 of the first region R1 of the molding material 140 has a curved shape (e.g., upwardly convex) and may be adjacent to the upper surface u2 of the second region R2. In addition, the level L1 at which the upper surface u1 of the first region R1 of the molding material 140 is positioned may vary depending on each measurement position, and the level at which the highest point of the upper surface u1 of the first region R1 of the molding material 140 is displayed as L1 in the drawing.

In addition, since descriptions of other configurations are the same as those specifically described in other parts of the present specification, detailed descriptions of these configurations will be omitted in the interest of brevity.

Figure 9:
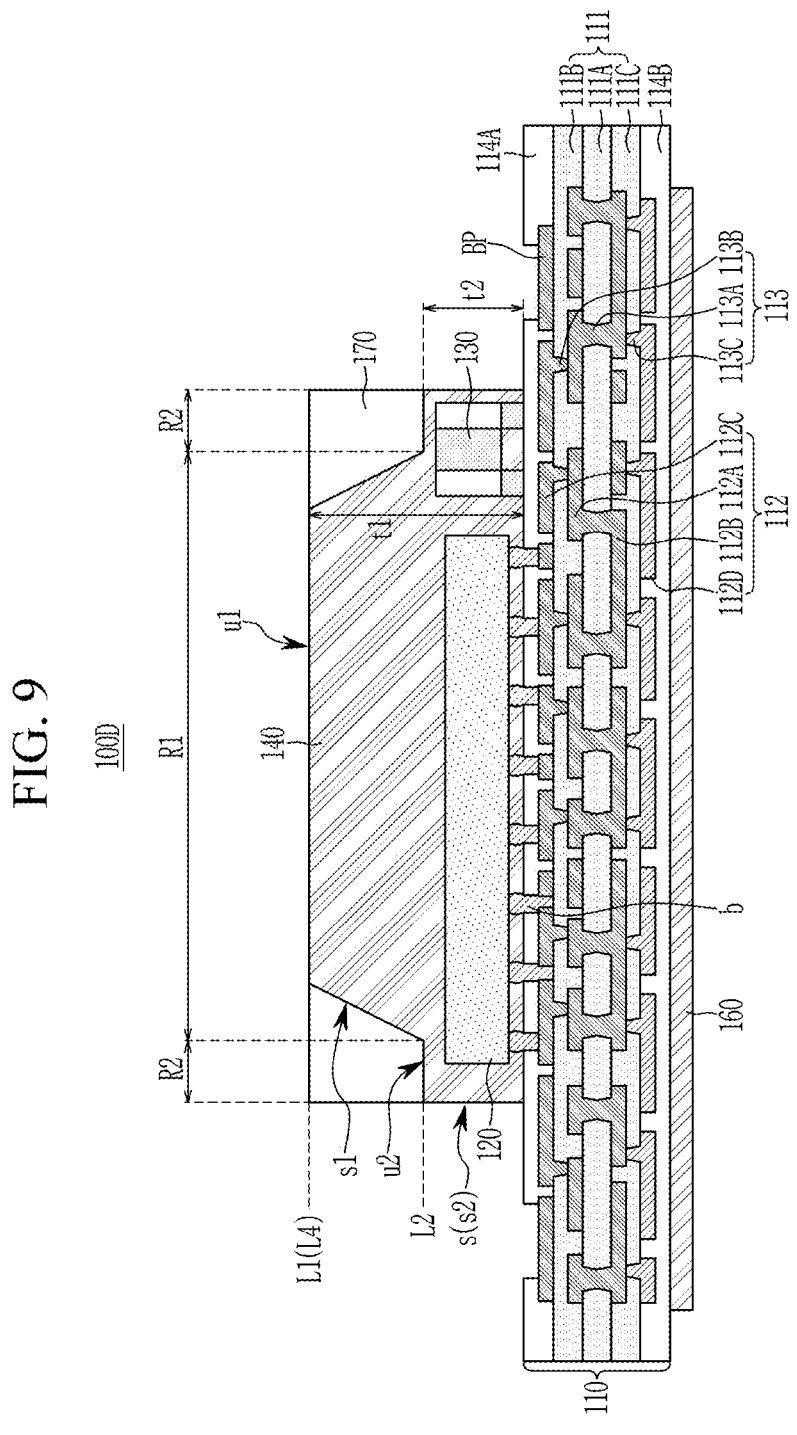
FIG. 9 is a cross-sectional view of a fingerprint sensor package according to some other embodiments of the present disclosure.

FIG. 9 is a cross-sectional view of a fingerprint sensor package according to some other embodiments of the present disclosure.

In the case of the fingerprint sensor package 100D according to some other embodiments of the present disclosure, a second molding material 170 having a relatively small elastic modulus compared to the first molding material 140 is introduced instead of the buffer member 150, thereby having a relieving effect on the pressure applied to the wiring pattern WP similar to the embodiments of introducing the buffer member 150.

The second molding material 170 may cover or surround the side surface s1 of the first region R1 of the first molding material 140 and the upper surface u2 of the second region R2. The second molding material 170 may cover the entire side surface s1 of the first region R1 of the first molding material 140 and the entire upper surface u2 of the second region R2, but also may cover only a part of the side surface s1 of the first region R1 of the first molding material 140 and a part of the upper surface u2 of the second region R2.

An elastic modulus of the second molding material 170 may be less than the elastic modulus of the first molding material 140.

For example, the second molding material 170 may include at least one of polyethylene, polypropylene, polycarbonate, polyurethane, polytetrafluoroethylne (TEFLON™), and silicone rubber.

An upper surface u1 of the first region R1 of the first molding material 140 may be exposed onto the second molding material 170. By not covering the upper surface u1 of the first region R1 of the first molding material 140 with the second molding material 170, it is possible to prevent an increase in the thickness of the fingerprint sensor package 100D due to the second molding material 170.

In addition, the upper surface of the second molding material 170 may be coplanar with the upper surface u1 of the first region R1 of the first molding material 140. In other words, the level L4 at which the upper surface of the second molding material 170 is positioned may be substantially the same as the level L1 at which the upper surface u1 of the first region R1 of the first molding material 140 is positioned. However, this is not limited thereto, and the level L4 at which the upper surface of the second molding material 170 is positioned may be higher or lower than the level L1 at which the upper surface u1 of the first region R1 of the first molding material 140 is positioned.

The second molding material 170 may further cover the exterior side s of the first molding material 140, and in this case, the entire molding material positioned on the outermost side of the molding material to form the exterior side has a small elastic modulus, thereby more effectively relieving the pressure applied to the wiring pattern WP.

In addition, since descriptions of other configurations are the same as those specifically described in other parts of the present specification, detailed descriptions of these configurations will be omitted in the interest of brevity.

Figure 10:
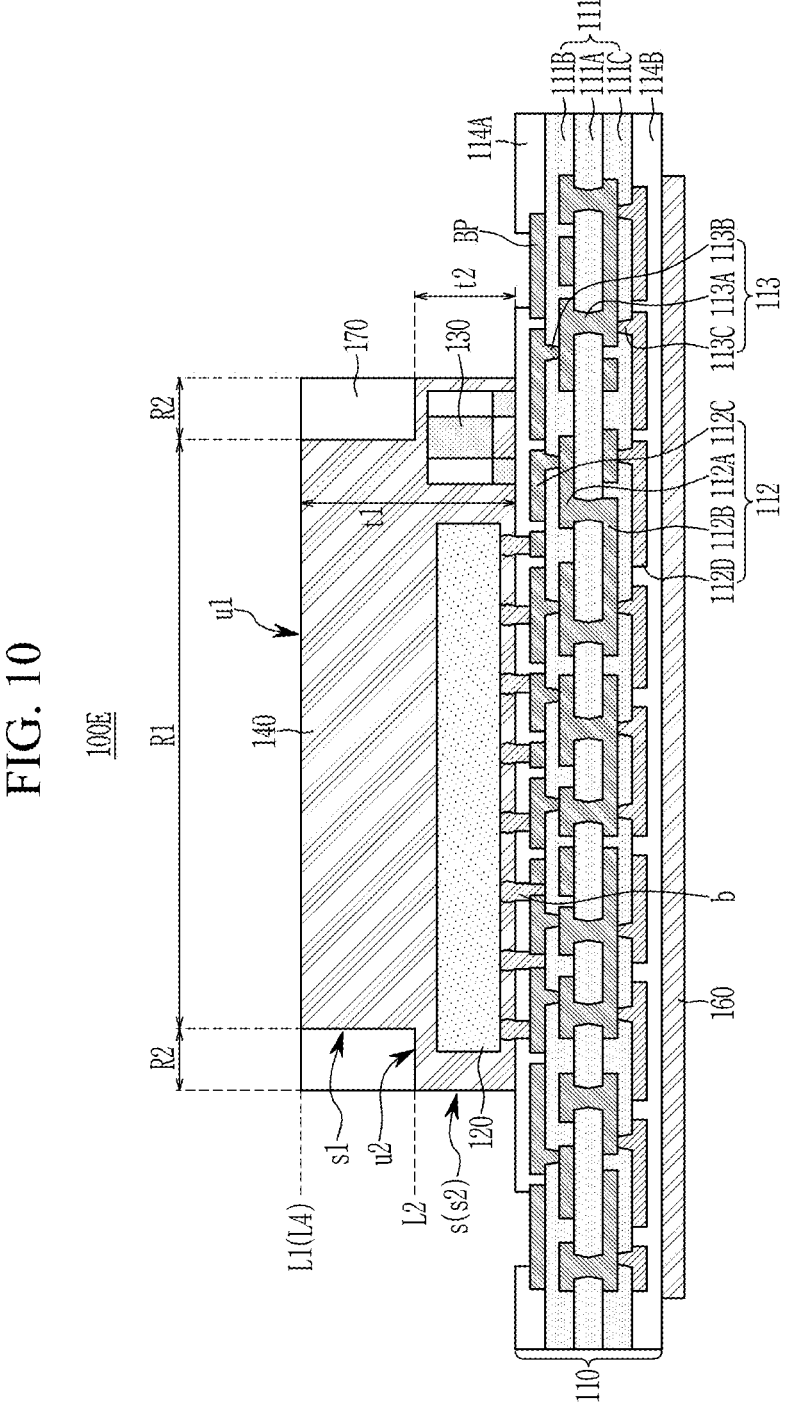
FIG. 10 is a cross-sectional view of a fingerprint sensor package according to some other embodiments of the present disclosure.

FIG. 10 is a cross-sectional view of a fingerprint sensor package according to some other embodiments of the present disclosure.

In the case of the fingerprint sensor package 100E according to some other embodiments of the present disclosure, the side surface s1 of the first region R1 of the molding material 140 may form an approximately vertical angle with the substrate 110 compared to the fingerprint sensor package 100D shown in FIG. 9. Through this structure, the area of the second region R2 in which the second molding material 170 is placed may be further enlarged.

In addition, since descriptions of other configurations are the same as those specifically described in other parts of the present specification, detailed descriptions of these configurations will be omitted in the interest of brevity.

Figure 11:
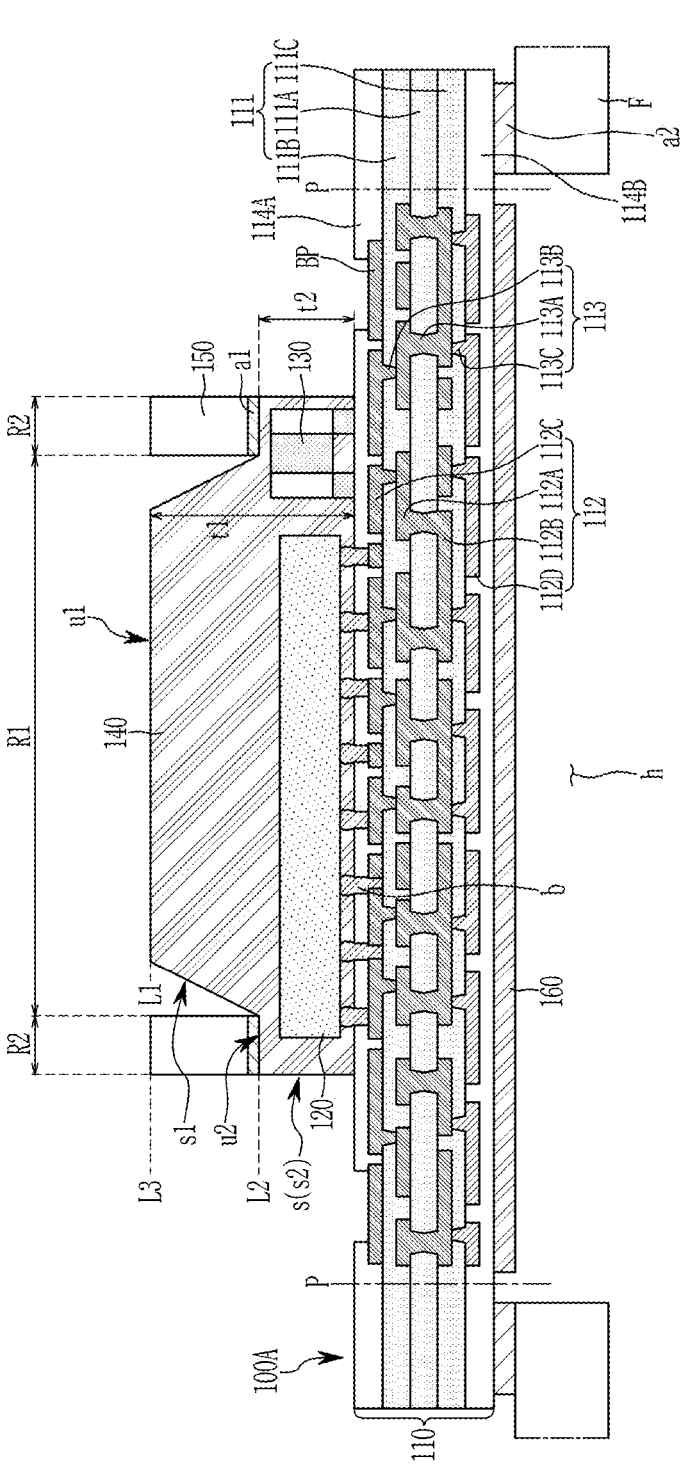
FIG. 11 is a cross-sectional view of a fingerprint sensor package placed on a film according to some embodiments of the present disclosure.

FIG. 11 is a cross-sectional view of a fingerprint sensor package placed on a film according to some embodiments of the present disclosure.

Referring to the drawing, the fingerprint sensor package 100A may be placed on the film F having the penetration hole h and transferred. Between the fingerprint sensor package 100A and the film F, an adhesive member a2 for attaching them to each other may be placed. The penetration hole h of the film F may prevent the central region of the substrate 110 in which the fingerprint sensor chip 120 is placed from contacting the film F. In a later process, the fingerprint sensor package 100A may be processed along the punching line P and then inserted into the card body, and accordingly, may be separated from the film F. In this specification, for better understanding and case of description, both the fingerprint sensor package before being processed along the punching line P and the fingerprint sensor package after being processed will be referred to as fingerprint sensor package 100A.

In addition, since descriptions of other configurations are the same as those specifically described in other parts of the present specification, detailed descriptions of these configurations will be omitted in the interest of brevity.

Figure 12:
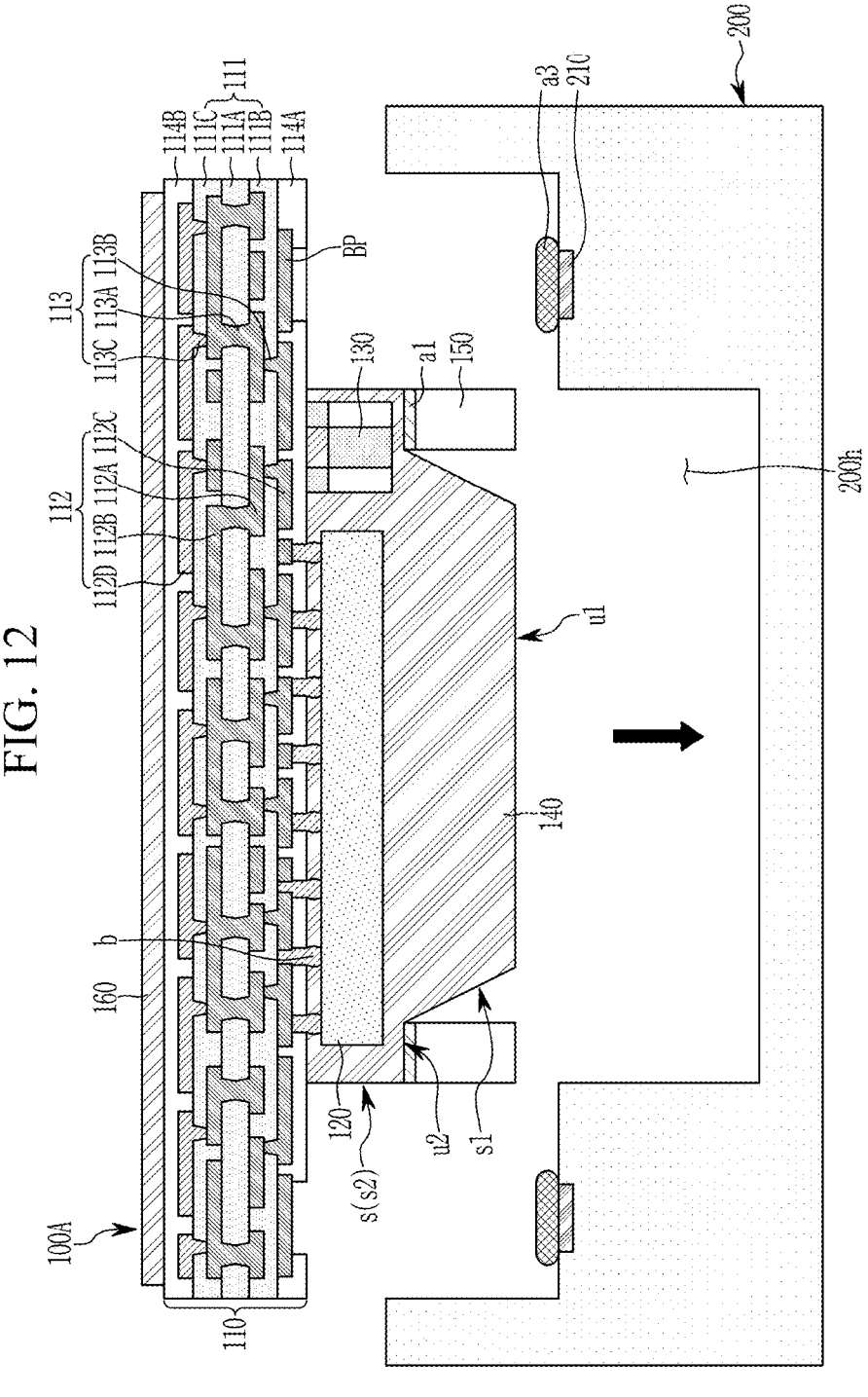
FIG. 12 illustrates a process of bonding a fingerprint sensor package to a card body according to some embodiments of the present disclosure.

FIG. 12 illustrates a process of bonding a fingerprint sensor package to a card body according to some embodiments of the present disclosure.

Referring to the drawing, the fingerprint sensor package 100A may be inserted into the groove 200h of the card body 200 after being processed along the punching line.

The card body 200 may include a connection pad 210, and the connection pad 210 of the card body 200 may be physically bonded and electrically connected to the connection pad BP of the fingerprint sensor package 100A through the conductive adhesive member a3.

As shown in the drawing, the conductive adhesive member a3 may first be attached to the connection pad 210 of the card body 200, and the connection pad BP of the fingerprint sensor package 100A may be attached to the conductive adhesive member a3 attached to the connection pad 210. Alternatively, the conductive adhesive member a3 may first be attached to the connection pad BP of the fingerprint sensor package 100A, and the connection pad 210 of the card body 200 may be attached to the conductive adhesive member a3 attached to the connection pad 210 of the card body 200.

In addition, since descriptions of other configurations are the same as those specifically described in other parts of the present specification, detailed descriptions of these configurations will be omitted in the interest of brevity.

Figure 13:
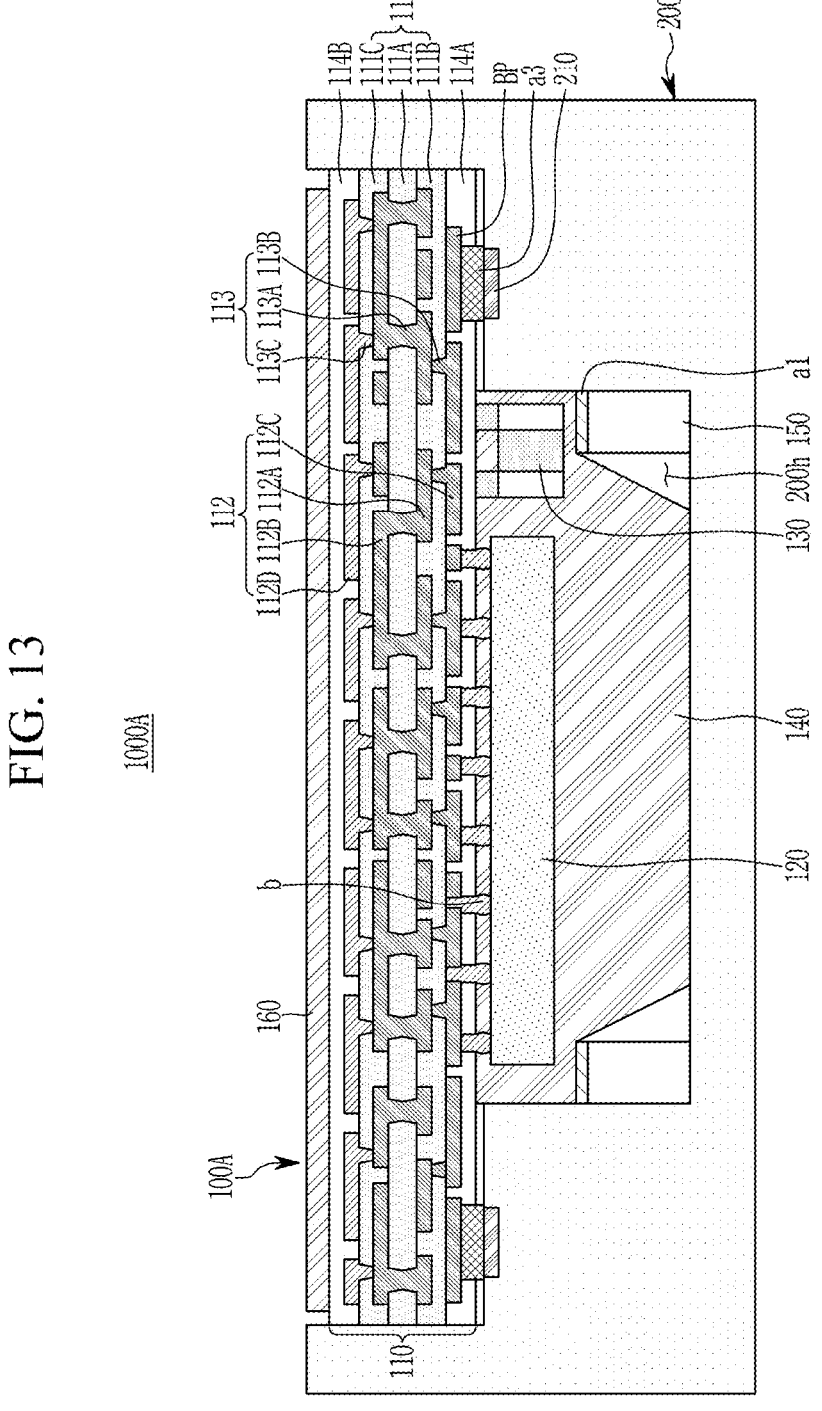
FIG. 13 is a cross-sectional view of a fingerprint authentication card according to some embodiments of the present disclosure.

FIG. 13 is a cross-sectional view of the fingerprint authentication card according to some embodiments of the present disclosure.

The fingerprint authentication card 1000A may include a card body 200 having a groove 200h and a fingerprint sensor package 100A inserted into the groove 200h.

The groove 200h of the card body 200 may have a shape corresponding to the fingerprint sensor package 100A inserted therein. For example, a region in contact with the substrate 110 and a region in contact with the molding material 140 among the grooves 200h of the card body 200 may have a level difference.

The card body 200 may include a connection pad 210 to electrically connect with the fingerprint sensor package 100A. The connection pad 210 may be a buried pad embedded in the card body 200, or a protruded pad placed on the card body 200.

The fingerprint sensor package included in the fingerprint authentication card 1000A may be any one of the fingerprint sensor packages according to the present disclosure, and is not limited to the fingerprint sensor package 100A shown in FIG. 13 as an example.

The fingerprint sensor package 100A may be inserted into the groove 200h in order for the molding material 140 to face the card body 200. The molding material 140 and the card body 200 of the fingerprint sensor package 100A may come into contact with each other, but there may also be a slight gap between the molding material 140 and the card body 200.

The fingerprint authentication card 1000A may further include a conductive adhesive member a3 placed between the connection pad 210 of the card body 200 and the connection pad BP of the fingerprint sensor package 100A. The conductive adhesive member a3 may be an anisotropic conductive film (ACF), for example.

In addition, since descriptions of other configurations are the same as those specifically described in other parts of the present specification, detailed descriptions of these configurations will be omitted in the interest of brevity.

Figure 14:
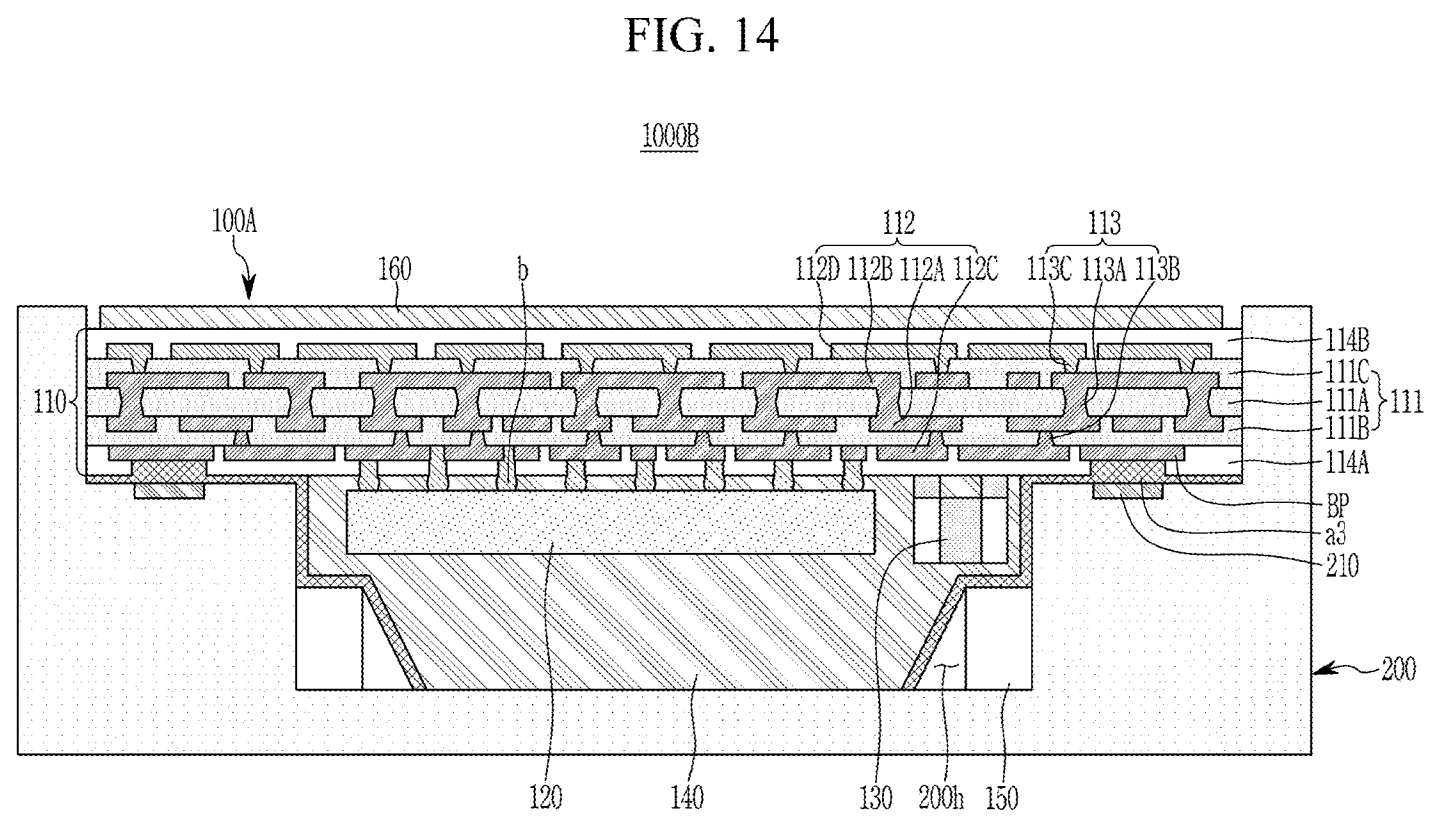

FIG. 14 is a cross-sectional view of a fingerprint authentication card according to some other embodiments of the present disclosure.

In the case of the fingerprint authentication card 1000B according to some other embodiments of the present disclosure, the conductive adhesive member a3 may be extended to be placed to the second region R2 of the molding material 140. Therefore, the conductive adhesive member a3 may cover or surround the side surface s2 and the upper surface u2 of the second region R2 of the molding material 140. Accordingly, the adhesive area between the card body 200 and the fingerprint sensor package 100A may be increased.

In addition, in the case of the fingerprint authentication card 1000B, the molding material 140 and the buffer member 150 may be attached to each other through the conductive adhesive member a3, like the connection pads, so a separate adhesive member a1 is not required. Accordingly, the manufacturing process may be more simplified.

Meanwhile, although not limited thereto, as illustrated in the drawing, the conductive adhesive member a3 may further cover or surround the side surface s1 of the first region R1 of the molding material 140. For example, when the fingerprint sensor package is the fingerprint sensor package 100B shown in FIG. 5, it may be preferable for the conductive adhesive member a3 to further cover the side surface s1 of the first region R1 of the molding material 140 to increase the adhesive area between the molding material 140 and the buffer member 150.

Figure 15:
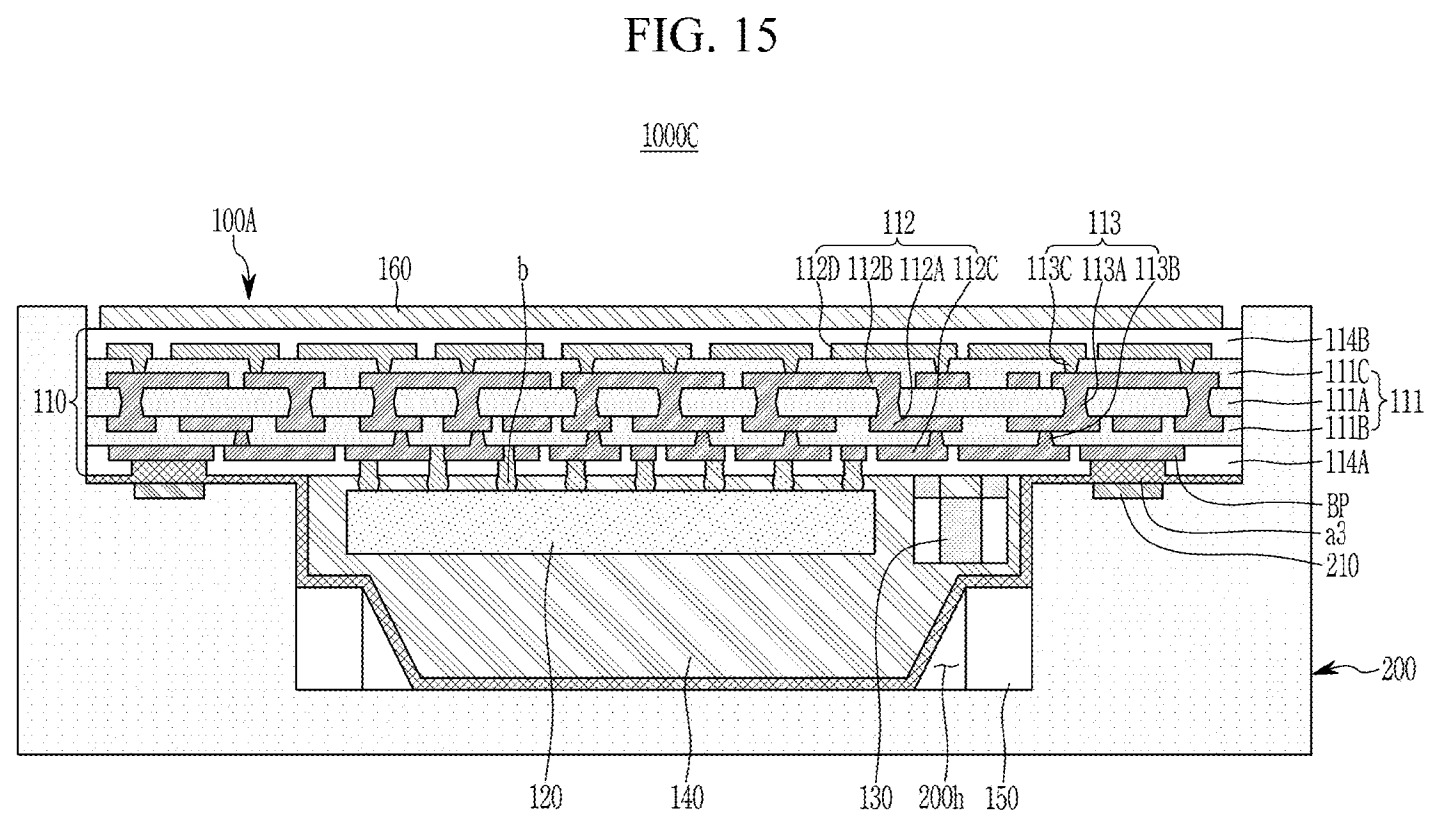

FIG. 15 is a cross-sectional view of a fingerprint authentication card according to some other embodiments of the present disclosure.

In the case of the fingerprint authentication card 1000C according to some other embodiments of the present disclosure, the conductive adhesive member a3 may further cover the upper surface u1 of the first region R1 of the molding material 140. When the conductive adhesive member a3 covers the first region R1 together with the second region R2 of the molding material 140, the manufacturing process may be further simplified.

In addition, since descriptions of other configurations are the same as those specifically described in other parts of the present specification, detailed descriptions of these configurations will be omitted in the interest of brevity.

Although example embodiments of this disclosure has been described in detail above, the scope of the present disclosure is not limited to the scope of the example embodiments, but various modifications and improvements apparent to the person of an order skill in the art using the concepts of the present disclosure defined in the following claims also belong to the scope of the present disclosure.

What is claimed is:

1. A fingerprint sensor package comprising:
a substrate including an insulating layer and a wiring layer;
a fingerprint sensor chip on the substrate;
a molding material on the substrate to mold the fingerprint sensor chip and including a first region and a second region surrounding the first region; and
a buffer member on the second region of the molding material,
wherein the wiring layer includes a wiring pattern extending from an inside to an outside of the molding material,
wherein the wiring layer further includes a connection pad positioned on an outside of the molding material, and wherein a vertical level of an upper surface of the second region of the molding material is lower than a vertical level of an upper surface of the first region of the molding material.

2. The fingerprint sensor package of claim 1, wherein: a thickness of the second region of the molding material is 70% or more and 80% or less of a thickness of the first region of the molding material.

3. The fingerprint sensor package of claim 1, wherein: the upper surface of the second region of the molding material is substantially flat.

4. The fingerprint sensor package of claim 1, wherein: the upper surface of the first region of the molding material is substantially flat.

5. The fingerprint sensor package of claim 4, wherein: an angle between a side surface of the first region of the molding material and horizontal is 60° or more.

6. The fingerprint sensor package of claim 1, wherein: a vertical level of an upper surface of the buffer member is the same as the vertical level of the upper surface of the first region of the molding material or lower than the vertical level of the upper surface of the first region of the molding material.

7. The fingerprint sensor package of claim 1, wherein: the fingerprint sensor package further includes an adhesive member between the molding material and the buffer member.

8. The fingerprint sensor package of claim 1, wherein: the wiring layer includes a first wiring layer closest to the fingerprint sensor chip, the wiring pattern is included in the first wiring layer, and the first wiring layer includes the connection pad.

9. The fingerprint sensor package of claim 7, wherein: the adhesive member comprises an anisotropic conductive film.

10. The fingerprint sensor package of claim 8, wherein: the substrate includes the insulating layer to cover the first wiring layer and further includes a protection layer with an opening to expose the connection pad.

11. The fingerprint sensor package of claim 1, wherein: the fingerprint sensor package further includes a passive device on the substrate spaced apart from the fingerprint sensor chip and molded with the molding material.

12. The fingerprint sensor package of claim 1, wherein: the fingerprint sensor package further includes a coating layer on a surface opposite to the surface of the substrate on which the fingerprint sensor chip is disposed.

13. A fingerprint sensor package comprising: a substrate including an insulating layer and a wiring layer; a fingerprint sensor chip on the substrate; a first molding material on the substrate at least partially covering the fingerprint sensor chip and including a first region and a second region surrounding the first region; and a second molding material on a side surface of the first region of the first molding material and an upper surface of the second region of the first molding material, wherein the wiring layer includes a wiring pattern extending outwardly from an inside to an outside of the first molding material, wherein a vertical level of the upper surface of the second region of the first molding material is lower than a vertical level of an upper surface of the first region of the first molding material, and wherein an elastic modulus of the second molding material is less than an elastic modulus of the first molding material.

14. The fingerprint sensor package of claim 13, wherein: the upper surface of the first region of the first molding material is exposed by the second molding material.

15. The fingerprint sensor package of claim 14, wherein: an upper surface of the second molding material is coplanar with the upper surface of the first region of the first molding material.

16. The fingerprint sensor package of claim 13, wherein: the second molding material is further on an exterior side of the first molding material.

17. A fingerprint authentication card comprising: a card body having a groove; and a fingerprint sensor package in the groove, wherein the fingerprint sensor package includes: a substrate including an insulating layer and a wiring layer; a fingerprint sensor chip on the substrate; a molding material on the substrate and on the fingerprint sensor chip and including a first region and a second region surrounding the first region; and a buffer member between the second region of the molding material and the card body, wherein the wiring layer includes a wiring pattern extending outwardly from an inside to an outside of the molding material, wherein a vertical level of an upper surface of the second region of the molding material is lower than a vertical level of an upper surface of the first region of the molding material, wherein the fingerprint sensor package is in the groove so that the molding material faces the card body, and wherein: the card body includes a first connection pad, and the wiring layer further includes a second connection pad electrically connected to the first connection pad.

18. The fingerprint authentication card of claim 17, wherein: the fingerprint sensor package further includes a conductive adhesive member between the first connection pad and the second connection pad.

19. The fingerprint authentication card of claim 18, wherein: the conductive adhesive member extends onto the second region of the molding material.

20. The fingerprint authentication card of claim 18, wherein: the conductive adhesive member is an anisotropic conductive film.

* * * * *